Nov. 17, 1959  T. S. ZAJAC  2,913,263
PIN DETENT PIPE OR TUBE COUPLING WITH MANIPULATOR
Filed July 5, 1957
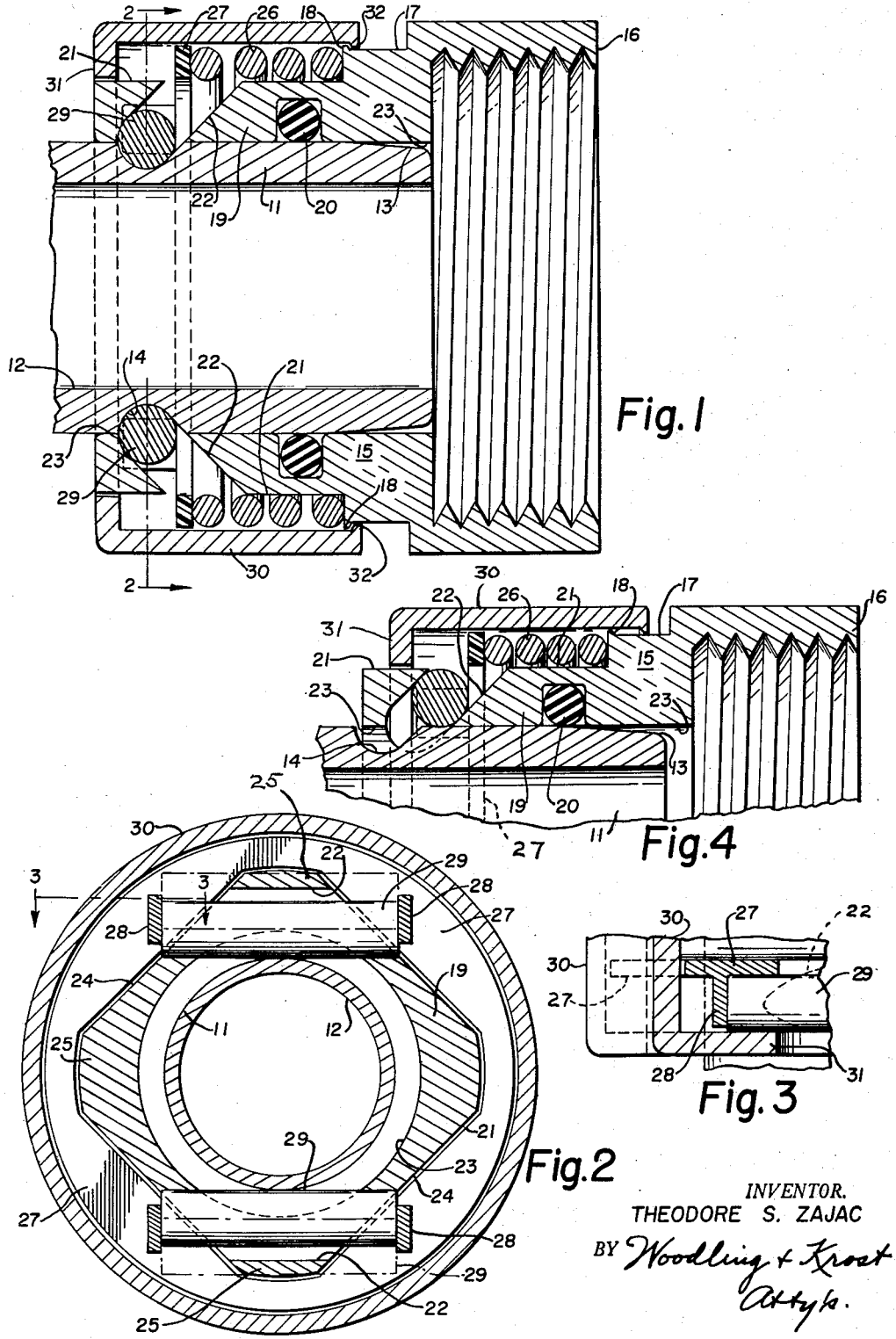
INVENTOR.
THEODORE S. ZAJAC
BY Woodling + Krost
Attys.

United States Patent Office 2,913,263
Patented Nov. 17, 1959

2,913,263

PIN DETENT PIPE OR TUBE COUPLING WITH MANIPULATOR

Theodore S. Zajac, Parma, Ohio, assignor to Zalo Manufacturing Company, a corporation of Ohio Application July 5, 1957, Serial No. 670,209

6 Claims. (Cl. 285—277)

My invention relates to couplings for fluid lines and particularly to readily attachable and detachable couplings.

An object of my invention is to provide a coupling mechanism so constructed as to provide for a maximum size of internal bore for the coupling relative to the outer diameter of the bore.

Another object is to provide for a construction having an increased capacity of flow through the coupling while maintaining the outer dimensions of the coupling.

Another object is to provide for ready and convenient connection of the male and female parts of a coupling with a minimum of manual effort and with a simple movement.

Another object is to provide an improved construction in a coupling mechanism for providing the interlocking of the male and female parts of the coupling so as to obtain improved results and a superior operation.

Another object is to provide a coupling mechanism which is economical in construction and efficient in use.

Other objects and a fuller understanding of my invention may be had by referring to the following description and claims, taken in conjunction with the accompanying drawing, in which:

Figure 1 is a longitudinal, sectional view of my improved coupling device with the forward end of a male nipple fitting inserted therein;

Figure 2 is a cross-sectional view of my device taken through the line 2—2 of Figure 1;

Figure 3 is a sectional view taken through the line 3—3 of Figure 2; and

Figure 4 is a partial sectional view of my coupling showing the parts in a different relative position than shown in Figure 1.

In Figure 4 the coupling member is unlocked from the groove in the male member, whereas in Figure 1 the coupling member is locked to the male member inserted therein.

In the drawing, the male nipple fitting 11 is of the usual type and only its forward end which is associated with the female coupling is shown. This male fitting 11 has an internal cylindrical bore 12 extending therethrough to the open forward end thereof. The outer wall of the nipple fitting 11 is chamfered or sloped at 13 so as to facilitate the ready entrance of the male member 11 into the opening of the female coupling. The male member 11 has an annular groove 14 extending therearound and spaced from the extreme forward end of the male member 11. This groove 14 in effect provides two spaced shoulders on the outer wall of the male member, these shoulders being spaced from each other in an axial direction, as shown in the drawing.

My invention is embodied in the female coupling denoted generally by the reference character 15. This female coupling 15 has a threaded connecting end portion 16. In the embodiment shown, the threaded end portion 16 has internal female threads, although of course a threaded connection could also be provided by having male threads for connecting the coupling to a hose, tube or other conduit.

The female coupling member 15 has a body 17 of round shape. This body 17 has its maximum diameter outwardly of the threaded portion 16. Adjacent the threaded end portion 16, there is a reduced cylindrical portion of the body 17. At the edge of the cylindrical portion of the body 17 there is an annular bead or raised edge 18 extending therearound.

Extending forwardly from the cylindrical portion of the body 17 there is a long hollow body 19. A cylindrical bore extending axially through the body portion 17 and the long hollow body 19 has a cylindrical wall 23 which extends from the forward end of the long hollow body 19 and back to the threaded connecting portion 16. Thus, there is a fluid passageway extending completely through the female coupling 15.

An O-ring annular seal of rubber or rubber-like material is seated in an internal annular groove within the hollow body 19 so as to provide a sealing contact to make a sealing engagement with the male member 11 inserted within the bore of the female coupling 15.

The outer wall surface 21 of the body 19, that is, of the coupling body forwardly of the cylindrical portion 17, is non-cylindrical in cross-section. As seen in Figure 2, this non-cylindrical wall surface 21 has four flat portions 24, opposite flat portions 24 being parallel to each other and other flat portions 24 being at right angles to each other. Rather than being cylindrical in shape so as to be concentric with the internal cylindrical wall 23, the outer wall 21 is roughly rectangular in cross-section, having four relatively thick portions 25 located at four equally spaced locations circumferentially around the body 19. This leaves the body 19 with a wall that is relatively thin intermediate the thick portions 25.

Cut or otherwise formed in the body 19 are two slanted slots 22 which open from the outer non-cylindrical wall 21 on opposite sides of thick portions 25 and which open radially inward to the internal bore within the body 19 so as to extend through the cylindrical wall 23 of this internal bore. The slots 22 are disposed on opposite sides of the hollow body 19 and are inclined as shown in the drawing to extend radially inward and forwardly toward the open end of the female coupling 15.

It is to be noted that the slots 22 may be accommodated in the wall of the body 19 by reason of the fact that they are located at diametrically opposed thick portions 25 of the hollow body 19. If instead, an attempt were made to locate the slots at the thinner portions of the hollow body 19, there would not be enough thickness of material to accommodate the slots 22. Also by having the slots located as shown in the drawing so as to extend through opposite thick portions 25, the opposite ends of each slot 22 open outwardly at the external non-cylindrical wall surface 21 closer to the axis of the body than if the outer wall surface 21 were cylindrical in shape. This is because the flat portions 24 converging at each thick portion 25 are closer together than would be comparable portions of a cylindrical wall.

Positioned in each of the slanted slots 22 is a cylindrical locking pin 29, these pins 29 being movable radially and longitudinally of 19 by the guidance offered by the walls of the slots 22. The opposite ends of each pin 29 extend outwardly to beyond the flat portions 24 of the non-cylindrical wall surface 21. By reason of the disposition of the flat portions 24 and the arrangement of the parts, the pins 29 need not be as long as they would have to be if they were to extend outwardly beyond a cylindrical wall instead of the non-cylindrical wall 21.

An abutting member 27 is positioned around the hollow body 19 so as to be movable in an axial direction. This abutting member 27 is preferably formed of nylon, although it may also be constructed of metal. The abutting member 27 is generally in the form of a washer which has an internal opening of non-circular form complementing the non-cylindrical outer wall surface 21 of the body 19. Thus, the abutting member 27 fits around the body 19 but may be moved longitudinally thereof. The abutting member 27 has integrally formed therewith two pairs of guide portions 28 extending in a longitudinal direction and adjacent the opposite end surfaces of the respective locking pins 29. These guide portions 28 slidably engage the ends of the pins 29 while allowing the pins 29 to move radially and longitudinally in their respective slots 22. The guide portions 28 limit movement of each pin 29 along the axis of the pin 29.

A coil spring 26 is mounted around the hollow body 19 outwardly of the non-cylindrical wall surface 21 thereof, this coil spring being resiliently biased to urge the abutting member 27 forwardly of the coupling member 15, that is, toward the left in Figures 1 and 4. As seen in the drawing, coil spring 26 abuts the shoulder adjacent the cylindrical body portion 17 and also abuts the abutting member 27.

The abutting member 27 engages the outer end portions of each pin 29 so as to urge the pins 29 forwardly and radially inward to the position shown in Figure 1. There are sufficient of the end portions of the pins 29 protruding from the opposite ends of the slots 22 that the pins 29 may always be engaged by the abutting member 27, thus urging the pins radially inward and forward.

An actuating member or outer sleeve 30 is mounted on the coupling member 15 and is concentric with the bore thereof, this actuating member 30 being preferably made of nylon, although it may also be made of metal or other suitable material. The actuating member 30 is generally of cylindrical shape and has an internal flange portion 31 at the forward end thereof. A lip or bead portion 32 of the actuating member 30 is in longitudinal alignment with the raised edge or bead 18 of the cylindrical body portion 17 of the coupling. By reason of the partially yieldable nature of nylon, the bead 32 may be forced over the bead 18 so as to interlock the actuating member 30 with the cylindrical body portion 17. There is sufficient space between the raised edge or bead 18 and the shoulder of the threaded end portion 16 so as to permit a limited longitudinal movement of the actuating member 30 relative to the body of the coupling member.

The forward internal flange portion 31, as seen particularly in Figure 3, engages the opposite end portions of the pins 29. Thus, the end portions of the pins 29 are positioned intermediate of the abutting member 27 and the internal flange 31 of the actuating member 30. The resiliency of the coil spring 26 urges the abutting member 27 forwardly and hence urges the pins 29 forwardly and radially inward. Since the pins 29 also engage the flange portion 31, the resiliency of the spring 26 may be overcome by manually moving the actuating member or sleeve 30 rearwardly, that is, to the right in Figures 1 and 4. This moves the pins 29 rearwardly and radially outward, moves the abutting member 27 rearwardly, and compresses the spring 26. Release of the actuating member 30 permits the coil spring 26 to again move the abutting member 27 forwardly, the pins 29 forwardly and radially inward, and the actuating member 30 forwardly.

In Figure 1, the pins 29 are in their locked position so as to interlock with the annular groove 14 of the male fitting member 11. In Figure 4, the actuating member 30 has pushed the pins 29 rearwardly and radially outward so as to clear or escape from the annular groove 14 of the male member 11. This rearward movement of the pins 29 has simultaneously moved the abutting member 27 rearwardly and compressed the spring 26.

It is to be noted that upon the initial insertion of the male member 11, the chamfered forward end 13 moves the pins 29 outwardly sufficient to permit the entry of the male member 11 into the coupling 15. As soon as the pins 29 register, or are aligned with, the annular groove 14, then the action of the spring 26 is such that the pins 29 are automatically moved forwardly and radially inward to engage in the groove 14 of the male member 11. Thus, the male member is securely interlocked with the female member or coupling. The unlocking of the female coupling member from the male member is done by manually moving the actuating member 30 rearwardly forcibly against the spring 26, and as previously described, this action moves the pins 29 rearwardly and radially outward so as to disengage the groove 14 of the male member 11.

By reason of the construction and arrangement of the parts here shown and described, I have been able to obtain a large capacity bore through the female coupling member relative to the outer dimensions of the coupling. If the outer wall of the hollow body 19 were cylindrical and concentric with the inner bore 23, the slots 22 would need to have such dimensions to permit the pins 29 to protrude outwardly therefrom so far that the outer dimensions of the entire coupling would be greatly in excess of those which I have been able to obtain while having the relatively large inner cylindrical bore. A large capacity flow through the coupling has been provided while holding the outer diameter of the coupling to a minimum and an efficient coupling having a high degree of utility has been produced with an economical construction.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a fluid line coupling having a generally cylindrical nipple fitting, said nipple fitting having an annular groove extending therearound, the improvement of a sleeve fitting adapted to receive and couple with said nipple fitting, said sleeve fitting having a cylindrical bore adapted to receive said nipple fitting, said sleeve fitting having slots extending through the wall thereof transversely of the sleeve fitting and inclined inwardly and toward the outer end thereof, said sleeve fitting having an outer wall spaced radially outwardly of said bore, the internal wall of said bore and said outer wall being spaced radially apart at the opposite ends of said slots radially inward of said fitting substantially less than at locations intermediate said ends radially outward of said fitting, pins transversely disposed in said sleeve fitting and slidable in said slots and having end portions protruding from the said opposite ends of the respective slots beyond said outer wall, and an abutting member disposed outwardly of said sleeve fitting and movable axially of said sleeve fitting, said abutting member having pin-engaging portions next adjacent said outer wall and at the opposite ends of said slots to engage said end portions and to move said pins in the respective slots radially and longitudinally of the sleeve fitting, said pin-engaging portions and the end portions of the pins engaged thereby in the innermost positions of said pins being disposed substantially within the radial limits of a reference cylinder coinciding with said outer wall at said locations intermediate of the ends of said slots whereby the length of said pins may be minimized relative to the diameter of said cylinder bore of said sleeve fitting, said abutting member having spaced portions extending therefrom and adjacent the opposite ends of the respective pins to limit the protrusion of the pins from the opposite ends of the respective slots in sliding in said slots.

2. The combination as claimed in claim 1, and including resilient means carried by the sleeve fitting to urge said abutting member in a direction to move said pins in said slots inwardly toward said outer end of the sleeve fitting to engage in said annular groove of a said nipple fitting inserted into said bore.

3. A female coupling member for receiving and engaging a male nipple member having an annular groove formed therein for interengaging with locking pins of the coupling member, said coupling member having a bore for receiving said nipple member, said bore having a cylindrical wall, said coupling member having an outer wall spaced radially outwardly in a common transverse plane at variable distances from said cylindrical wall to form longitudinally extending ridges along said coupling member, the coupling member having slots each disposed at an acute angle to the axis thereof, said slots respectively forming notches in said ridges and extending from locations of maximum spacing of the outer wall from the said cylindrical wall radially inward toward locations of minimum spacing of the outer wall from the said cylindrical wall, pins disposed transversely of the coupling member in each of said slots, respectively, and movable therein toward and away from the axis of the coupling member to engage a said nipple member in the annular groove thereof, said pins having opposite end portions protruding from said slots outwardly of said outer wall, and an abutting member disposed adjacent said ridges movable axially of said coupling member and having pin-engaging portions disposed adjacent said outer wall at locations outwardly of said slots on the opposite sides of said ridges, respectively, to engage the protruding end portions of the respective pins and to move the pins in said slots radially inward of the coupling member, said abutting member and said end portions of the respective pins being interengageable substantially within the limits defined by a reference cylinder disposed axially of the coupling member and generally coinciding with said locations of maximum spacing of the outer wall of the coupling member, said difference in the spacing of said outer wall permitting such interengagement within said limits and permitting minimization of the length required for said pins relative to the diameter of the said bore of the said coupling member.

4. A coupling member as claimed in claim 3, and including guide means carried by said abutting member to slidably engage the opposite ends of the respective pins and to guide the said movement of said pins toward and away from the axis of the coupling member.

5. A female coupling member adapted to connect with a male fitting inserted therein, said male fitting having an annular shoulder formed therearound, comprising in combination, a hollow female body having a cylindrical bore adapted to receive said male fitting, said female body having a non-circular wall surface radially outward of said bore to provide a wall around said bore of variable thickness, said body having a slot formed therein disposed at an incline to the axis of the bore from a location of relative thickness radially inward to spaced locations of relative thinness, a pin positioned in said slot transversely of said body and having its opposite ends protruding from said slot, said pin upon being moved in said slot radially inward of said body extending transversely of said bore and adapted to engage the annular shoulder of a said male fitting, and an abutting member having an inner open space complementing at positions adjacent the ends of said slot the non-circular wall surface of said body and disposed outwardly of said body to be moved axially thereof, said abutting member being positioned to abut the said pin adjacent its opposite ends immediately outwardly of said spaced locations of relative thinness for moving said pin in said slot toward said bore to engage an annular shoulder on a said male fitting, said abutting member and said body being disposed relative to each other to guide the axial movement of the abutting member, the variable thickness of said wall and the position of said abutting member immediately outwardly of said spaced locations of relative thinness providing for a minimization of the radially outward extent of said abutting member relative to the diameter of said cylindrical bore.

6. A coupling member as claimed in claim 5, and including resilient means carried by said body for urging said abutting member against said pin to move the pin radially inward toward said bore, and an actuating member carried by said body and disposed to oppose said resilient means for moving said pin radially outward from said bore, said actuating member having a portion complementarily conformed to said non-circular wall surface to be keyed to said body.

References Cited in the file of this patent

UNITED STATES PATENTS

| | | |
|---|---|---|
| 2,069,434 | Eastman | Feb. 2, 1937 |
| 2,297,548 | Fox | Sept. 29, 1942 |
| 2,344,740 | Shaff | Mar. 21, 1944 |
| 2,810,592 | Williams | Oct. 22, 1957 |

FOREIGN PATENTS

| | | |
|---|---|---|
| 628,517 | Great Britain | Aug. 30, 1949 |